United States Patent
Teter

[15] 3,668,781
[45] June 13, 1972

[54] BASEBALL DIAMOND LAYOUT DEVICE

[72] Inventor: Harold P. Teter, 3929 Lor Ron Avenue, Kent, Ohio 44240

[22] Filed: Feb. 24, 1970

[21] Appl. No.: 13,533

[52] U.S. Cl. ................................................ 33/1, 33/138
[51] Int. Cl. ............................... A63c 19/06, G01b 3/10
[58] Field of Search ...................... 33/1 LE, 138, 137, 139

[56] References Cited

UNITED STATES PATENTS

| | | | |
|---|---|---|---|
| 3,269,015 | 8/1966 | Barker | 33/138 X |
| 3,514,863 | 6/1970 | Moll | 33/1 LE X |
| 464,205 | 12/1891 | Swope | 33/137 |
| 3,289,306 | 12/1966 | Todd | 33/138 |
| 2,553,613 | 5/1951 | True | 33/139 |

Primary Examiner—Robert B. Hull
Attorney—Oldham & Oldham

[57] ABSTRACT

A device for laying out the base lines and the locations of the bases and pitcher's mound of a baseball diamond. A flat five-sided plate overlies home plate and has a pair of rails which extend below the first plate and abut against the edges of the home plate on the base lines to the first and third bases. A pair of reels of non-elastic cord are mounted on the flat plate and the cords from these reels drawn along the right and left rails, respectively. The cords have marks to indicate where their ends are a distance of 90 feet from the point of the home plate. A second mark on each cord indicates a distance of 180 feet from the point of the home plate. A third reel is also provided and the cord from this reel extends along the bisector of the angle between the first two cords. A third rail is provided on the flat plate to indicate when the third cord is being drawn along the proper line. This cord has a mark indicating the distance from the home plate to second base and from hole plate to the pitcher's mound.

6 Claims, 8 Drawing Figures

PATENTED JUN 13 1972 3,668,781

INVENTOR.
HAROLD P. TETER
BY
Oldham & Oldham
ATTORNEYS

BASEBALL DIAMOND LAYOUT DEVICE

This invention relates to a device for laying out baseball diamonds and more particularly to such a device which facilitates the accurate laying out of a baseball diamond without the need for surveying instruments.

A regulation baseball diamond is in the form of a square 90 feet on a side with the pitcher's mound located on the diagonal joining home plate and second base and a distance of 60 feet 6 inches from the home plate. The accurate laying out of a baseball diamond has, heretofor, required either the use of surveying instruments and a knowledge of surveying techniques or a lengthy trial and error procedure. Since many of the playing fields used for baseball are also used for other sports and activities it is not feasable to permanently mark the baseball diamond on the playing field and is thus necessary to frequently lay out the diamond.

It is the primary object of my invention to provide a device for laying out a baseball diamond which permits this to be done rapidly and accurately but without the use of surveying instruments or complicated measuring techniques. Another object of the invention is the provision of a baseball diamond layout device which may be used to lay out either a regulation size baseball diamond or a smaller diamond, such as is used in Pony League baseball, for example. A further object of the invention is the provision of such a device which may be used to layout a diamond either from a permanently affixed home plate or without such a plate.

The above and other objects and advantages of the invention will become apparent upon consideration of the following specification and the accompanying drawing wherein there is shown a preferred embodiment of the invention.

Figure 4:
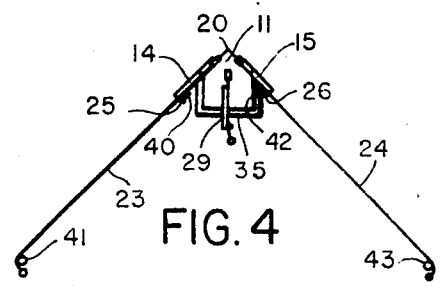
Figure 6:
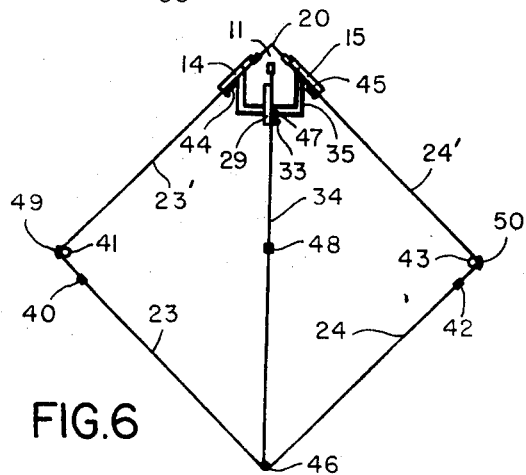
Figure 5:
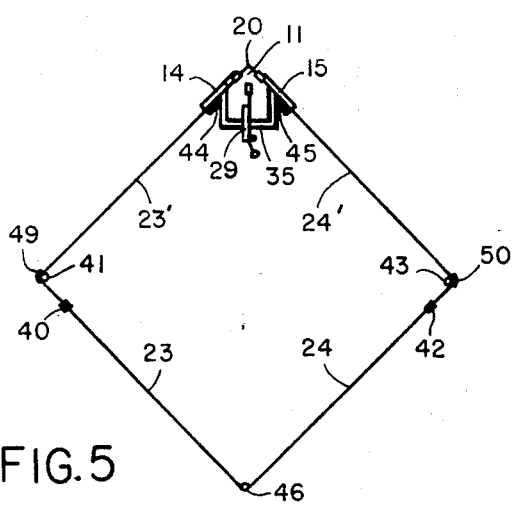
Figure 7:
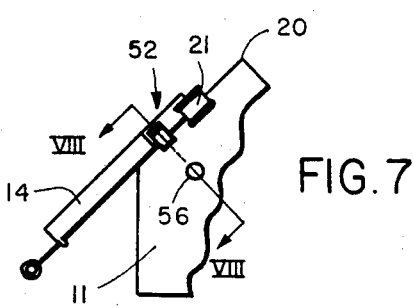
Figure 8:
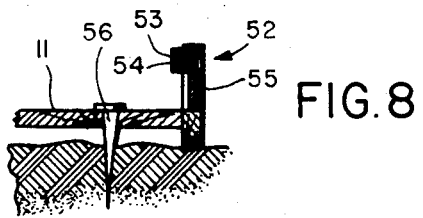

FIGS. 4, 5, and 6 are plan views showing successive stages in the laying out of a baseball diamond with the device of my invention;

FIG. 7 is a fragmentary plan view of a modified form of the diamond layout device of my invention; and FIG. 8 is a fragmentary sectional view taken along the line VIII—VIII of FIG. 7.

Figure 1:
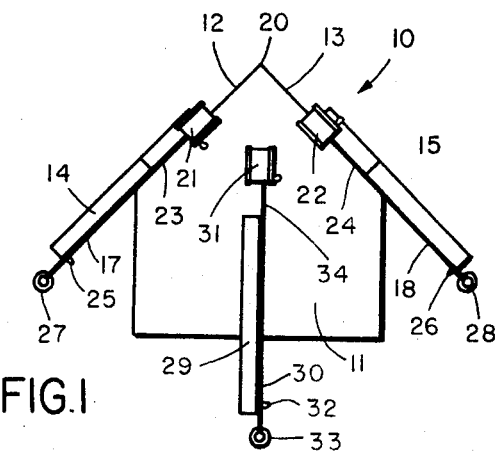
FIG. 1 is a plan view of the baseball diamond layout device of my invention.
Figure 2:
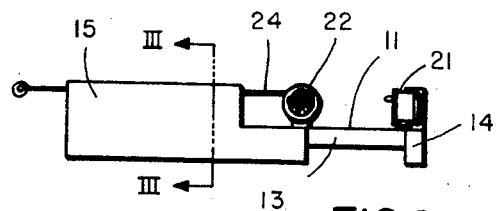
FIG. 2 is a side elevational view of the device of FIG. 1.
Figure 3:
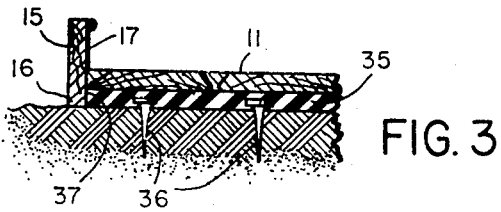
FIG. 3 is a fragmentary vertical section taken along the line III—III of FIG. 2.

Referring now to FIGS. 1, 2, and 3, the reference numeral 10 designates generally the baseball diamond layout device of my invention. The device 10 consists of a flat baseplate 11 of a similar configuration to that of the standard home plate. The plate 11 is five-sided and has a pair of edges 12 and 13 which extend at right angles to one another. Mounted on the edges 12 and 13 are straight arms or rails 14 and 15 which project beyond the edges of the plate 11. The lower portion 16 of each of the arms extends below the lower surface of the plate 11 and the outer portions of the arms 14 and 15 extend above the upper surface of the plate 11 providing side surfaces 17 and 18 which are vertically aligned with the edges 12 and 13 respectively, of the plate 11. Mounted on the plate 11 near the point of intersection 20 between the edges 12 and 13 and closely adjacent these edges are a pair of reels 21 and 22. The reels may be inexpensive fishing reels which are provided with locking means so that the reels may be held against rotation when desired. Wound on each of the reels is a length of non-elastic cord 23, 24. The cord 23 extends from the reel 21 along the inner edge 17 of the rail 14 and may be threaded through an eye or guide 25. The free end of the cord 23 is provided with a ring 27. Likewise, the cord 22 extends along the inner surface 18 of the rail 15 and is threaded through a guide 26 and provided with a ring 28 at its end, which, as shown in the drawing, is at a distance from the reel at least equal to the length of the edges 12 and 13 of home plate, deemed considerable enough for accuracy in the alignment of the cord for the purpose of baseball diamond layout. A third rail or arm 29 is mounted on the base plate 11 with one of its side surfaces 30 in alignment with the bisector of the angle between the sides 12 and 13 of the plate 11. A reel 31 is mounted on the plate 11 near the inner end of the arm 29 and a length of non-elastic cord is wound around this reel and extends along the side surface 30 of the arm 29. The cord 34 is threaded through an eye or guide 32 at the outer end of the arm 29 and is provided with a ring 33 at its end, which, as shown in the drawing, is at a distance from the reel at least equal to the length of the edges 12 and 13 of home plate, deemed considerable enough for accuracy in the alignment of the cord for the purpose of baseball diamond layout.

When the device of my invention is used to layout a baseball diamond where a home plate, which may consist of a hard rubber pad 35 anchored to the ground by spikes 36, is already provided the plate 11 is fitted over the home plate. The downwardly projecting lower portions 16 of the side rails 14 and 15 abut against the edges 37 on the pointed sides of the home plate. As shown in FIG. 4, when the layout device 10 has been positioned on the home plate with the lower portions of the rails 14, 15 abutting the edges of the plate, the arms 14 and 15 extend in the directions of first and third bases, respectively, with the inner faces 17 and 18 of these arms in vertical alignment with their respective base lines. The cord 23 is now unwound from the reel 21 until a first marker 40 on the cord 23 reaches a reference point along the arm 14. In FIG. 4, the eye or guide 25 serves as reference point and the marker 40 which may be a knot, a colored mark, or a piece of tape is located on the cord 23 to that when this marker meets the reference point the distance from the ring 27 at the free end of the cord 23 to the point of intersection 20 of the edges 12 and 13 of the plate 11 is equal to the distance between homeplate and first base, 90 feet for a regulation baseball diamond. As the cord 23 is unwound from the reel 21 it is kept straight and parallel to the edge 17 of the rail 14. At this time the ring 27 is at, at least approximately, the desired location of first base and a pin or stake 41 is driven partially into the ground at this point. The cord 24 is unwound from the reel 22 in the same manner until a marker 42 meets the reference point 26 of the rail 16. The outer end of this cord now marks the desired location of third base and a second stake 43 is driven into the ground at this point. An additional 90 feet of cord, as indicated by the markers 44 and 45, is unwound from each of the reels 21 and 22. The cords 23 and 24 are run around the pins 41 and 43 at right angles to the length of cord 23' and 24' extending from the reels to the pins. The ends of the cords 23 and 24 now meet and are fastened over a pin or stake 46 at the location of second base.

In order to check the accuracy of the location of the stakes 41, 43, and 46 and to determine the location of the pitcher's mound, the cord 34 is now unwound from the reel 22 until the distance from the ring 33 at the free end of the cord to the point 20 of the baseplate 11 is 127 feet 3⅜ inches. If the pins 41, 43, and 46 have been accurately located the ring 33 at the end of the cord 34 will now reach to the pin 46 at the location of second base. Additional markers 49 and 50 may be provided on the cords 23 and 24 to indicate a distance of 90 feet from the end of the cords to the markers 49 and 50 and from the points 20 to the markers 49 and 50. If there has been any error in the positioning of the stakes 41, 43, or 46 it can now be corrected by moving the stakes until the cords 23', 24', and 34 extend parallel to the edges 17, 18, and 30, respectively, and the markers 49 and 50 are even with the pegs 41 and 43. Since all three sides of each of the triangles formed by the point 20, the pin 41, and the pin 46 and by the point 20, the pin 43, and the pin 46 are determined by the length of the cords 23, 23', and 34 and by the lengths 24, 24', and 34, the accuracy of the layout assured. First, second, and third base and the pitcher's mound may now be suitably marked, first base being located at the pin 41 between the cord lengths 23 and 23', second base at the pin 46 between the cord lengths 23 and 24, third base at the pin 43 between the cord lengths 24 and 24', and the pitcher's mound at the marker 48 which is provided on the cord 34 a distance of 60 feet 6 inches from the point 20. If desired, the base lines may now be marked with chalk or lime. The pins 41, 43, and 46 are now removed and the cords 23, 24, and 34 rewound on their respective reels. The layout device 10 is now removed from home plate and the baseball diamond is ready for use.

When it is desired to lay out a baseball diamond where a permanently affixed home plate is not provided the layout device of my invention may be provided with removeable pins 56 which position the base plate and anchor it firmly to the ground. The same procedure as described above is now followed to lay out the baseball diamond.

As shown in FIGS. 7 and 8, a wiper pad assembly 52 may be provided near each of the reels 22, 23, and 31 to remove chalk dust from the cord as it is rewound. This wiping assembly may consist of a pair of pads 53 and 54 through which the cord passes. The pads 53 and 54 are preferably of a soft fiber or sponge-like material and are replaceably mounted on a suitable bracket 55 secured to the base 11.

It should now be apparent that I have provided a device which permits a rapid and accurate laying out of a baseball diamond without complicated techniques or the use of surveying instruments. Since the diamond is laid out as two triangles whoes sides are precicely determined the accuracy of the layout is assured. Since the layout device is fitted over the sides of the pointed portion of the home plate the correct orientation of the bases relative to home plate is also assured. It should also be apparent that, since the device of my invention makes use of readily usable components the layout device may be manufactured and sold at low cost.

While the layout device has been described with particular reference to a standard or regulation baseball diamond it should be apparent that the device may be readily modified to layout other sized diamonds if desired. Be providing additional markings of, for example, a contrasting color, on the cords 23, 24, and 34 the same device may be used to layout a number of different sized diamonds. For example, additional markings may be provided on the cords 23 and 24 to indicate a distance of 60 feet from first base to the point of home plate and 120 feet, a distance along the base lines from second base to the point of home plate. In this arrangement the cord 34 is provided with additional markings to indicate the distance from second base to the point of home plate and the distance from the pitcher's mound to home plate.

I claim:

1. A device for laying out a baseball diamond from home plate, comprising: a base member shaped like home plate having a pair of adjacent first and third base line defining edges extending at right angles to one another and having projecting lower portions adapted to engage over the base line aligned edges of home plate to hold the base member in fixed relation to home plate; first and second reels mounted on said base member and each having a length of non-elastic cord wound thereon, said first and second reels being fixed respectively along the first and second named edges of said base member with their reel axes orthogonal thereto, the cord from said first reel extending in vertical alignment with the first of said edges of said base member and the cord from the second of said reels extending in vertical alignment with the second of said edges of said base member; first and second guide means mounted on said base member at a distance from said respective reels at least equal to the length of said edges of home plate and in the vertical plane through the respective edge of said base member, said guide means indicating, respectively, the correct alignment of said first and second cords with said first and second edges of said base member when said cords are extended and drawn taut; a third reel mounted on said base member and having a length of non-elastic cord wound thereon, said third reel being fixed along the bisector of the angle between said first and second edges and with its reel axis orthogonal to said bisector, and the cord from said third reel extending in vertical alignment with said bisector; and third guide means mounted on said base member at a distance from said third reel at least equal to the length of said edges of home plate and in the vertical plane through said bisector, said third guide means indicating the correct alignment of said third cord when it is extended and drawn taut.

2. A baseball diamond layout device according to claim 1 further including: First marking means on said first and second cords, said means indicating the distance from first and third bases, respectively, to the point of intersection between said first and second sides of said base member; second marking means on each of said first and second cords, said second marking means indicating the sum of the distances between second and first bases and between first base and the point of intersection of said edges of said base member and the sum of the distances from second base to third base and the distance from third base to said point of intersection, respectively; first marking means on said third cord, said marking means indicating the distance between second base and said point of intersection; and second marking means on said third cord, said second marking means indicating the distance from the pitcher's mound to said point of intersection.

3. A baseball diamond layout device according to claim 1 further including: removeable pins secured to and extending downwardly from said base member, said pins adapted to secure said base member to the desired location on the playing field.

4. A baseball diamond layout device according to claim 1 further characterized in that said first and second guiding means comprise arms mounted on said base member and extending, respectively, a considerable distance along the first and second edges thereof.

5. A baseball diamond layout device according to claim 4 further characterized in that said arms are provided with upper portions projecting above said base member and providing a guiding edge in vertical cooperative alignment with said first and second edges of said base member, respectively.

6. A baseball diamond layout device according to claim 1 further including means for wiping said cords as said cords are rewound on their respective reels.

* * * * *